United States Patent [19]

Albert

[11] 4,007,375

[45] * Feb. 8, 1977

[54] MULTI-TARGET X-RAY SOURCE

[76] Inventor: Richard D. Albert, 317 Hartford Road, Danville, Calif. 94526

[ * ] Notice: The portion of the term of this patent subsequent to Dec. 9, 1992, has been disclaimed.

[22] Filed: July 14, 1975

[21] Appl. No.: 595,388

[52] U.S. Cl. .............................. 250/404; 250/272; 250/494; 315/371

[51] Int. Cl.$^2$ .................... G01J 1/00; G01N 23/20; G21K 1/00; H05G 1/30

[58] Field of Search .......... 250/405, 402, 398, 272, 250/403, 404, 493, 494; 315/370, 371

[56] References Cited

UNITED STATES PATENTS

| | | | |
|---|---|---|---|
| 3,925,660 | 12/1975 | Albert | 250/272 |
| R28,631 | 11/1975 | Waehner et al. | 315/371 |

*Primary Examiner*—Alfred E. Smith
*Assistant Examiner*—T. N. Grigsby
*Attorney, Agent, or Firm*—Phillips, Moore, Weissenberger, Lempio & Majestic

[57] ABSTRACT

An X-ray source provides for selective variations of the wavelength spectra or other characteristics of the X-ray output by including means for directing an electron beam to any selected one of a plurality of target-anodes. Beam energy may also be selectively adjusted. Beam position stabilization means respond to any change of beam energy by making compensating changes in the deflection signals so that the electron beam remains directed at a selected point on a selected target-anode in the presence of energy changes including both deliberate energy changes and variations resulting from random voltage fluctuations in the beam accelerating system. The beam position stabilization means may include a function generator to accommodate to a non-linear relationship between beam energy changes and the deflection signal changes required to maintain a selected beam trajectory.

17 Claims, 5 Drawing Figures

MULTI-TARGET X-RAY SOURCE

BACKGROUND OF THE INVENTION

This invention relates to apparatus for producing X-rays and more particularly to X-ray sources of the form having electron beam producing means, a plurality of different target-anodes and deflection means for directing the electron beam towards any selected one of the targets to produce X-rays having selectable characteristics.

Prior copending U.S. application Ser. No. 353,451 of the present Applicant, filed Apr. 24, 1973 and entitled "SELECTABLE WAVE LENGTH X-RAY SOURCE, SPECTROMETER AND ASSAY METHOD", which issued Dec. 9, 1975 as U.S. Pat. No. 3,925,660, discloses a highly advantageous form of X-ray source in which an X-ray beam may be selectively directed to any of a number of spaced apart target anodes in order to vary the wavelength spectrum or some other characteristic of the X-ray output. The general usefulness of an X-ray source is greatly enhanced if the output may be selectively varied. In medical radiology, for example, the particular wavelengths which are optimum for producing a photographic or fluoroscopic image in which bone structure is to be distinguished from the soft tissue of a patient may be different from the wavelengths which are most suitable for distinguishing tumors from healthy tissue. In checking the interior structure of castings or other manufactured parts for structural flaws by X-ray analysis, different wavelengths may be preferable for checking parts made of different materials or which have different shapes. An ability to change wavelengths is equally helpful in many other usages of X-ray sources.

In an X-ray source of this kind, the electron beam is switched from one target to another by applying appropriate deflection signals to a magnetic or electrostatic beam deflection means or in some cases to both. Once a particular target has been selected, it is desirable that the path of the electron beam remain fixed until such time as it is desired to change the characteristics of the X-ray output. In some instances it is not only desirable that the electron beam be maintained within the area of the selected target, but also that the particular point of impact of the beam on that target remain constant. In radiography, for example, the resolution obtainable in a photographic or fluoroscopic image is dependent in part on constancy of the point of origin of X-rays at the selected target. In X-ray spectrometry for determining the elemental composition of materials or in X-ray monitoring of materials for thickness variations, constancy of the X-ray origin point may be important in order to maintain a constant distribution of radiation across the material and in order to provide for reproducible results. In this way any non-uniformities in the region of the material being irradiated are always averaged out in the same way.

The energy of the electron beam within the source may vary either through random voltage fluctuations in the beam acceleration system or because it may be deliberately changed for any of various purposes. It may be desirable to adjust beam energy upon switching to a newly selected target, for example, to minimize bremmstrahlung radiation and thereby produce a substantially monochromatic X-ray output. Such changes of electron beam energy can complicate operation of the X-ray source in that a change of beam energy causes a shift in the point of impact of the electron beam at the selected target unless a compensating adjustment is also made in the deflection signal.

The necessary adjustment of the deflection signal may not always be proportional to the change of beam energy but may instead be a non-linear function of energy. Beam energy is strictly proportional to the accelerating voltage difference which is applied between the cathode and the target anodes of the source but the deflection signal magnitude required to direct the beam to a given point is not. Deflection signal magnitude is dependent on electron beam velocity which is not itself a linear function of beam energy or accelerating voltage.

Thus, it has frequently been necessary to make complicated deflection signal adjustments when beam energy is changed for operational purposes, such as in switching from one target to another. Insofar as indeliberate fluctuations in beam accelerating voltage are concerned, slow drift can be corrected for by monitoring a voltage reading instrument in order to make manual adjustments as necessary, but it is not practical to attempt to compensate for brief monentary perturbations of the accelerating voltage and beam trajectory in this manner. The general utility of multitarget X-ray tubes and ease of operation of such devices can be greatly enhanced if beam energy adjustments can be made or allowed to occur without requiring compensating manual adjustments in other controls.

SUMMARY OF THE INVENTION

This invention provides an X-ray source having means which maintains a stabilized fixed selected electron beam path toward any one of a plurality of target anodes regardless of electron beam energy variations including both deliberate energy changes and random changes which may arise from system voltage fluctuations. The point of impact of the electron beam on the selected target remains precisely fixed in the presence of beam energy variations until such time as the beam is deliberately redirected to another target. This is accomplished with means which responds to any change in the accelerating voltage difference between the cathode and anode of the source by producing a compensating change in the signal applied to the beam deflection system. The beam position control system may include a function signal generator to produce the necessary deflection signal changes if the required deflection signal change is a nonlinear function of the beam energy change.

Accordingly it is an object of this invention to simplify and to facilitate the operation of X-ray sources which have means for switching an electron beam to any selected one of a plurality of target anodes for the purpose of changing the wavelength or other characteristics of the X-ray output.

It is another object of the invention to simplify control operations required in connection with deliberate changing of electron beam energy within a multiple-target X-ray source.

It is still another object of the invention to stabilize the region of origin of X-rays within a selected target of a multiple-target X-ray source in the presence of electron beam energy variations, whether deliberate or of a random nature.

The invention, together with further objects and advantages thereof, will best be understood by reference to the following description of preferred embodiments taken in conjunction with the accompanying drawings.

DESCRIPTION OF PREFERRED EMBODIMENTS

Figure 1:
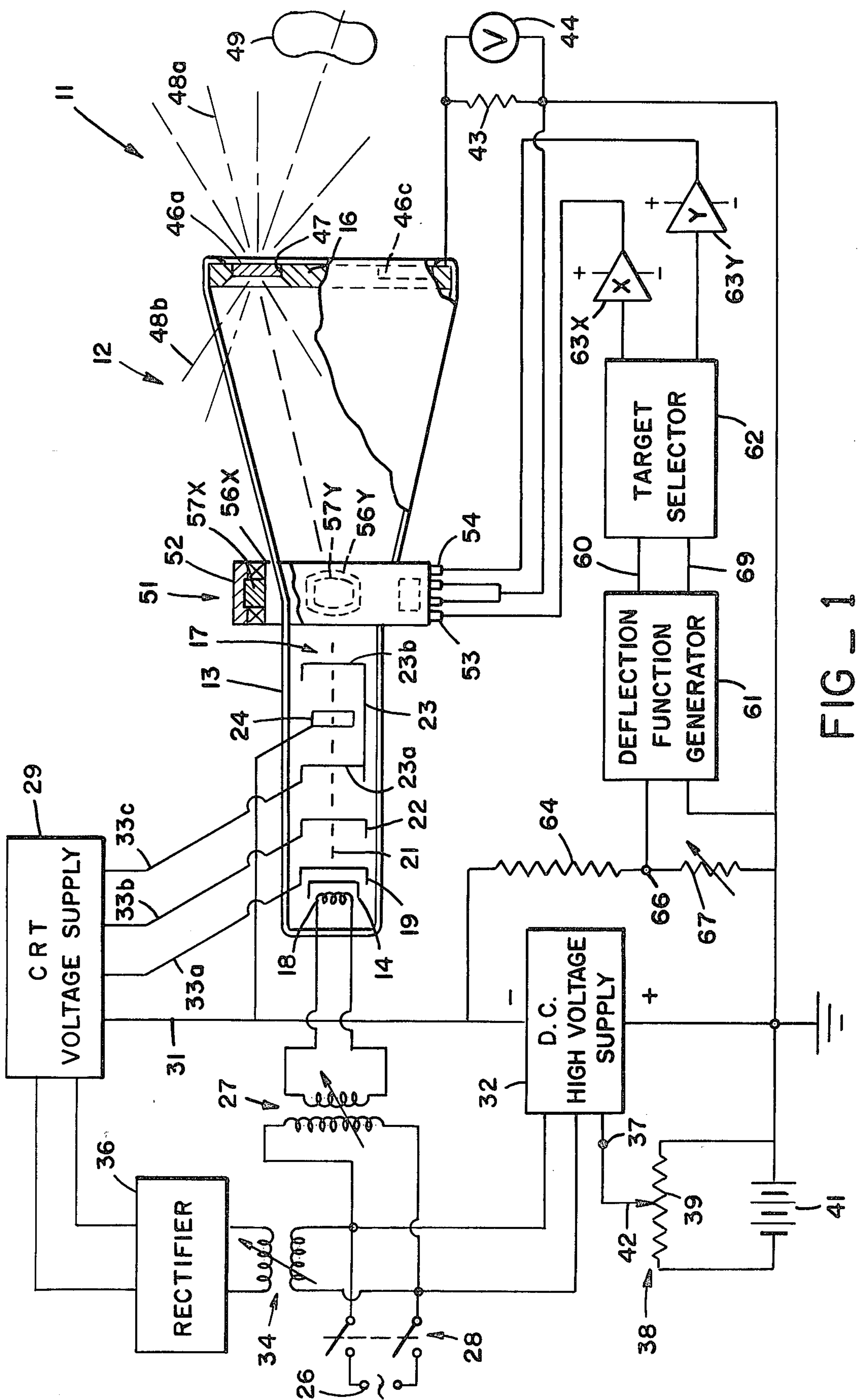
FIG. 1 illustrates an X-ray source and includes an axial section view of a multiple-target, selectable wavelength X-ray tube together with associated control circuits which are shown in schematic form.

Salient components of an X-ray source 11 embodying the present invention may include an X-ray tube 12 consisting of an evacuated sealed envelope 13 having an electron emissive cathode 14 at one end and a circular target-anode plate 16 at an opposite enlarged end. Cathode 14 is a component of an electron gun 17 which may be of the known form employed in cathode ray tubes, television picture tubes and the like. Such an electron gun 17 typically includes a filament 18 for heating the cathode and a control grid 19 for withdrawing electrons from the cathode in the form of a beam 21 which is initially directed along the axis of the tube toward the center of anode plate 16. The electron gun 17 also has a first anode grid 22 spaced forward from the cathode to accelerate the electron beam, a double second anode 23 having a pair of electrically connected grids 23*a* and 23*b* spaced at progressively greater distances forward from the first anode for further accelerating the electron beam, and an annular focusing electrode 24 disposed between grids 23*a* and 23*b* and which is supplied with a relatively more negative electrical potential in order to form the electrons into a narrow, well-defined beam.

The components of electron gun 17 may be electrically energized by power supply and control components similar to those customarily employed with cathode ray tubes. Thus opposite ends of filament 18 may be coupled to separate ones of a pair of alternating current utility power supply terminals 26 through an isolation transformer 27 and a control system On-Off switch 28. Isolation transformer 27 is employed since it is preferable that the cathode end of the tube 12 be the high-voltage end so that the anode end at plate 16 may be substantially at ground potential. This is a safer arrangement in that operating personnel, medical patients, manufactured parts or the like may sometimes be positioned in proximity to the anode end, depending on the usage which is being made of the X-ray source. In addition to isolating the high-voltage end of the tube from utility power terminals 26, the transformer 27 may provide for voltage step-down if required and may be a variable transformer to provide for adjustment of filament current.

A conventional cathode ray tube voltage supply 29 may be used to provide the necessary electrical potentials to the elements of the electron gun 17. CRT voltage supply 29 has a high-voltage input conductor 31 connected to a negative output terminal of an adjustable or programmable direct current high-voltage supply 32, the positive terminal of the high-voltage supply being grounded. CRT voltage supply 29 has three output conductors 33*a*, 33*b* and 33*c* connected to control grid 19, first anode 22 and second anode 23 respectively. Cathode 14 and focusing electrode 24 may be connected to the negative high-voltage conductor 31. Although these specific values should not be considered to be limiting in any manner, high-voltage supply 32 may typically apply a negative 10,000 volts to the input conductor 31 of CRT voltage supply 29 and also to cathode 14 and focusing electrode 24. The CRT voltage supply 29 may in turn typically apply 10,150 volts to the control grid 19, 9,500 volts to first anode 22 and 9,000 volts to second anode 23, all such voltages being negative relative to ground.

Since the CRT voltage supply 29 floats at a very high negative potential as described above, operating power is provided to the CRT voltage supply through another isolation transformer 34 and an AC to DC converter or rectifier 36. In most such cathode ray tube voltage supplies, the several output conductors 33 transmit voltages which have a predetermined fixed ratio to the voltage supplied to the input conductor 31. In order to provide for selective adjustment of the voltages supplied to the several electron gun elements, to permit adjustment of beam current for example, transformer 34 may be variable. This enables selective variation of the DC operating power voltage supplied to the cathode ray tube voltage supply which in turn enables adjustment of the magnitude of the voltages on output conductors 33 relative to the high voltage on the input conductor 31.

Suitable internal constructions for cathode ray tube voltage supplies 29 having the properties described above are known in the art and such components are available commercially, one such supply being identified as Model LU-15 and being manufactured and sold by Venus Scientific Inc. of 399 Smith Street, Farmingdale, N.Y. 11735. Similarly, suitable internal constructions for programmable DC high voltage supplies 32 are known to the art and such devices are also available commercially, one suitable high voltage supply being Model 101N, manufactured by the CPS Inc., 722 E. Evelyn Avenue, Sunnyvale, Calif. 94086. In these DC high voltage supplies, the output voltage may be selectively varied by changing the DC voltage applied to a control terminal 37. To provide a selectively adjustable voltage source for this purpose in the present system, a potentiometer 38 may have a resistive element 39 connected across a DC power source, such as battery 41, with the movable tap 42 of the potentiometer being connected to high voltage supply control terminal 37.

The conductive target-anode plate 16 of tube 12 is essentially grounded although it may be advantageous in some instances to provide a low value resistor 43, typically of several thousand ohms value, in the ground connection. While such a resistor allows the target-anode plate 16 to be substantially at ground potential, sufficient voltage drop is present across the resistor to enable a reading of electron beam current to be taken from a voltmeter 44 or other voltage-measuring device connected in parallel with the resistor. Correction for drift of beam current from some desired value may then readily be made by adjustment of variable transformer 34 to adjust the voltage of control grid 19 relative to cathode 14. The presence of the small resistor 43 also enables an automatic beam current stabilization system of the kind described in the above-identified copending application Ser. No. 353,451, to be employed if desired.

Owing to the high voltage difference between the cathode 14 and the more positive target anode plate 16, the electron beam 21 is accelerated along the axis of the tube and impacts against the target-anode plate, the several components of the electron gun 17 acting to produce the electrons, to provide initial electron acceleration and to focus and shape the beam in the conventional manner.

Figure 2:
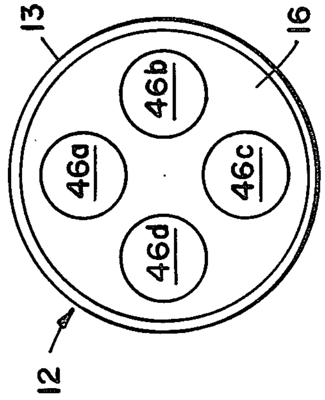
FIG. 2 is a view of the anode end of the X-ray tube of FIG. 1.

Referring now to FIG. 2 in conjunction with FIG. 1, the tube 12 is provided with a plurality of spaced-apart targets 43 which may be formed of different materials and which may be of different thicknesses so that the characteristics of the output X-rays of the tube may be selectively varied by switching the electron beam from one target to another. In the present example, four such targets 43*a*, 43*b*, 43*c* and 43*d* of circular configuration are disposed in target-anode plate 16, the four targets being angularly spaced apart with reference to the axis of the tube and being offset radially from the tube axis. Different numbers of targets of different configuration may be employed if desired. The several targets 46 are received in conforming passages 47 in the target-anode plate 16 and may be of less thickness so that each target is somewhat shielded from the others to inhibit cross contamination by sputtering of target material and to inhibit secondary X-ray production from primary X-rays emitted from another target.

The several targets are typically formed of different elemental materials, such as aluminum, copper, tungsten, for example, so that X-rays 48 of different wavelengths may be produced by directing the electron beam to different ones of the targets. With an appropriate selection of target materials and appropriate adjustment of the electron beam energy by means of potentiometer 38, several different substantially monochromatic X-ray outputs may be obtained from a single tube if desired. If sufficiently thin targets 46 are used, primary X-rays 48*a* are emitted forwardly from the face of the tube and may be utilized in any of the various known ways to irradiate an object 49 which may variously be a medical patient to be diagnosed or treated or manufactured parts to be examined for internal flaws or some other object depending on the usage to which the X-ray source 11 is put. X-rays 48*b* are also emitted in the backward direction from the targets 46 and the backward emitted X-rays may also be utilized in some cases by placing the subject 49 behind the target-anode plate 16 at one side of the tube 12. Very soft or low-energy X-rays, for example, may not be able to penetrate through the material of the target which produces such X-rays, and use of the backwardly emitted X-ray spectrum 48*b* may be in order where the soft X-rays are required.

With reference again to FIG. 1 in particular, a suitable beam-deflection means 51 is provided in order to direct the electron beam 21 to any selected one of the targets 46. In this example the deflection means 51 is an annular magnetic deflection yoke 52 disposed coaxially around the central portion of the tube. The magnetic deflection yoke 52 may be of the known form heretofore utilized for controlling electron beam trajectories in cathode ray tubes or television picture tubes in response to deflection signals supplied to an X-deflection terminal 53 and a Y-deflection terminal 54. Signals supplied to X-deflection terminal 53 energize windings 56 disposed around a pair of magnet poles 57 situated at diametrically opposed positions on opposite sides of the tube. Similarly, signals supplied to the Y-deflection terminal 54 energize windings 56Y disposed around another pair of poles 57Y which are on opposite sides of the tube and angularly spaced 90° from the position of X-poles 57X. As is understood in the art, energization of the X-windings 56X by application of a deflection signal to terminal 53 produces a transverse magnetic field across the path of the electron beam causing the beam to be deflected at right angles to the magnetic flux lines and in a direction dependent on the electrical polarity of the X-deflection signal. Similarly, energization of windings 56Y causes beam deflection in a direction normal to the deflection direction of the other set of poles. By energizing both sets of deflection windings 56 when necessary, the electron beam 21 may be directed to any selected area of the target-anode plate 16. Simultaneous energization of the two sets of windings is not normally required in this particular example since two of the targets 46*a* and 46*c* are spaced apart on either side of the axis of the tube along a line parallel to the X-deflection magnetic field direction while the other two targets 46*b* and 46*d* are similarly spaced apart along a line parallel to the direction of the magnetic field of the Y-deflection windings. Thus, energization of the X-windings 56X with an electrical current of predetermined magnitude deflects the beam to strike the center of target 46*b* while reversal of the polarity of such signal, without change of magnitude, redirects the beam to strike the center of target 46*d*. With the X-windings de-energized, the Y-windings 56Y may be energized with a predetermined known current to direct the electron beam to target 46*a* and if energized with an equal current of opposite polarity the beam is redirected to target 46*c*. Thus in this example, if electron beam energy stays constant, the basic deflection signal always has the same current value regardless of which of the four targets is selected and to switch targets it is only necessary to reverse the polarity of such signal and/or to reverse one of the terminals 53 and 54 to which it is applied. In practice, control of beam deflection becomes more complicated than this owing to the effects of beam energy changes on beam deflection.

It has been pointed out that it may be desired to adjust the electron beam energy through potentiometer 38 and it is also often found that momentary fluctuations or long-term drifts of the acceleration voltage between cathode 14 and target-anode plate 16 may occur notwithstanding the presence of voltage-regulating means in the circuit components. In the absence of a compensating change in deflection signal, any variation of the accelerating voltage will cause the point of impact of the electron beam on the selected target to shift. In some cases the degree of deflection would be changed sufficiently that the beam would no longer impact on the selected target at all. In the case of lesser beam energy changes the shifted point of beam impact would remain on the selected target, but since the point of impact determines the origin of emitted X-rays, this also may be undesirable for the reasons previously discussed.

Figure 3:
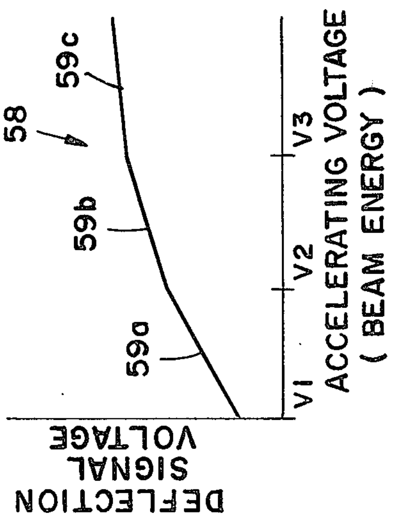
FIG. 3 is a graphical depiction of the changes in beam-deflection signal voltage as a function of electron beam energy in the X-ray source of FIG. 1.

Electron beam energy is a linear function of the voltage difference between cathode 14 and target-anode plate 16. However, the deflection signal magnitude required to produce a selected degree of beam deflection is not a linear function of beam energy but is, instead, proportional to beam velocity and velocity is itself a non-linear function of energy. The rate of change of velocity with respect to energy is inversely proportional to the square root of energy. Thus, to maintain a fixed beam trajectory when energy is varied, progressively smaller increases or decreases of deflection signal magnitude are required at progressively higher beam energy levels. This relationship is illustrated in FIG. 3 in which curve 58 is a close approximation of the non-linear relationship between beam energy and deflection signal magnitude required to maintain a fixed beam trajectory in the presence of energy variations.

Curve 58 is described as an approximation of the desired relationship since it is the curve generated by the beam position control means of the present invention and is actually made up of three linear sections **59*a*, 59*b* and 59*c* of progressively less slope. This approximation is sufficiently close to the theoretically optimum smooth curve to maintain a desired degree of beam deflection constancy under many conditions. In instances where still greater beam position constancy is necessary, the curve 58 may be brought closer to the theoretical optimum curve by utilizing a larger number of linear segments 59** as will hereinafter be described in more detail.

Referring now again to FIG. 1, the magnitude of the deflection signal applied to terminals 53 and 54 is controlled by a deflection function generator 61 acting through a target selector circuit 62 and X and Y-deflection current signal amplifiers 63X and 63Y respectively, suitable detailed constructions for this circuit being hereinafter described. To produce an input signal indicative of beam energy, a high value resistor 64 is connected between the negative side of DC high voltage supply 32 and a beam position control system input terminal 66, the terminal being in turn connected to ground through a relatively low value resistor 67 which is variable so that the magnitude of the beam energy signal may be adjusted.

As resistors 64 and 67 form a voltage divider, any change of accelerating voltage and thus any change of beam energy results in a voltage change at terminal 66. Specifically, if the negative accelerating voltage at tube 12 increases, the voltage at terminal 66 increases proportionately and if the accelerating voltage decreases, the terminal 66 voltage decreases proportionately.

If the changes in beam energy which may occur at tube 12 are sufficiently small and if some shifting of the beam trajectory can be tolerated, then the deflection function generator 61 may be a relatively simple proportional amplifier as a linear change of deflection signal may adequately compensate for a beam energy change under these circumstances. If large energy changes may occur or greater beam stability is required, the deflection function generator 61 may be a non-linear function generator, an example of which will be hereinafter discussed, which acts upon the input signal from terminal 66 in such a manner as to produce progressively smaller change in the deflection signal magnitude for given beam energy increases occurring at progressively higher energy levels. In either case, the deflection signals from function generator 61 are transmitted to the target selector 62 through a pair of conductors 68 and 69 which act to direct the signals to the deflection means terminals 53 and 54 through current amplifiers 63X and 63Y in order to direct the beam to the selected one of the targets 46.

Figure 4:
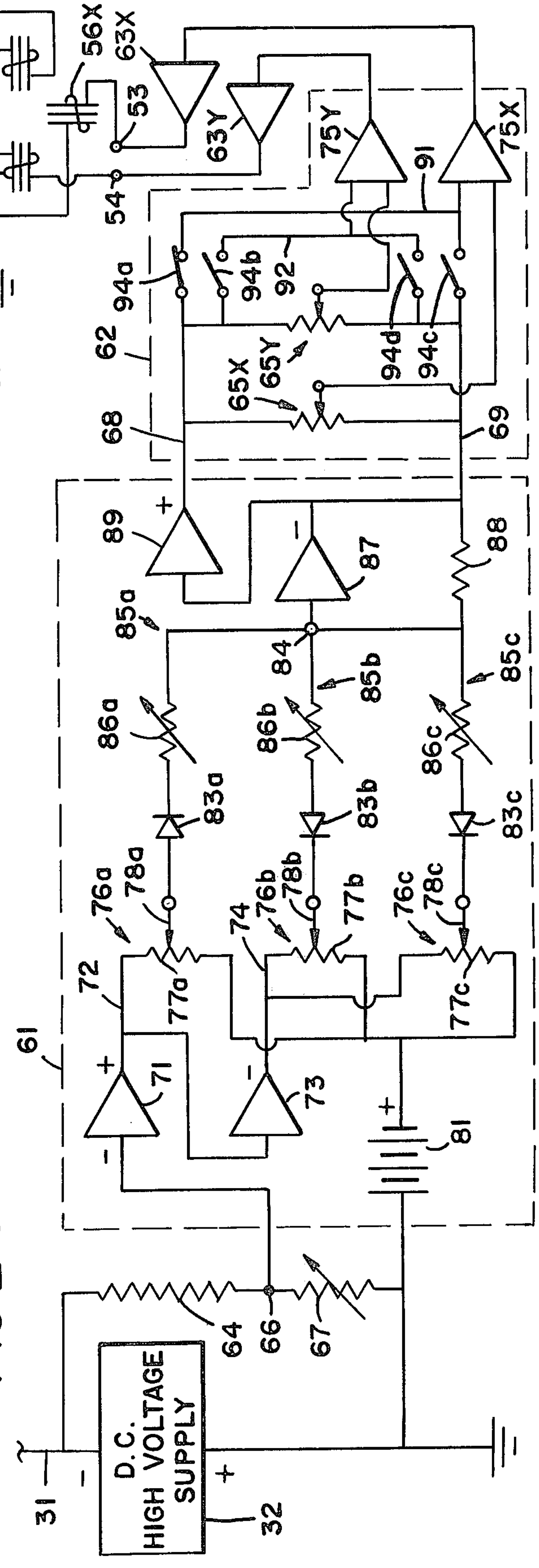
FIG. 4 is a circuit diagram showing details of the electron beam position control components of the X-ray source of FIG. 1.

Considering now a suitable internal design for the deflection function generator 61 and target selector 62, reference should be made to FIG. 4. As previously described, input terminal 66 of function generator 61 exhibits a negative voltage proportional to the cathode voltage or accelerating voltage of the X-ray tube 12. The terminal 66 voltage is applied to the input of a proportional amplifier 71 which inverts the voltage and applies the resulting positive potential to a conductor 72. An inverting amplifier 73 is connected between the output of amplifier 71 and another conductor 74 to apply a negative voltage of equal magnitude to conductor 74.

The function generator further includes three potentiometers **76*a*, 76*b* and 76*c* each having a resistive element 77*a*, 77*b* and 77*c* respectively and movable taps 78*a*, 78*b* and 78*c* respectively. One end of resistive element 77*a* connects to conductor 72 and the corresponding ends of resistive elements 77*b* and 77*c* both connect to conductor 74. The other ends of each resistive element 77 connect to the positive terminal of a DC voltage source, such as battery 81,** the negative terminal of the battery being grounded.

Movable tap **78*a* of potentiometer 76*a* is connected to the positive terminal of a diode 83*a* while the movable taps 76*b* and 78*c* of the other two potentiometers are connected to the negative sides of an additional pair of diodes 83*b* and 83*c* respectively. The negative side of diode 83*a* and the positive sides of diodes 83*b* and 83*c* are each separately connected to a summing junction 84 through an individual one of three variable resistors 86*a*, 86*b* and 86*c* respectively. Thus the voltage appearing at summing junction 84 is the algebraic sum of the voltages received through the three channels 85*a*, 85*b* and 85*c* defined by the three potentiometer, diode and variable resistor combinations. Junction 84 is coupled to the input of an operational amplifier 87, having a feedback resistor 88 connected across the amplifier input and output, to produce a negative deflection signal on the negative output conductor 69 of the function generator circuit. To supply a voltage of equal magnitude but of opposite or positive polarity to the other function generator output conductor 68, an inverting amplifier 89 is connected between conductors 69 and 68.**

Considering now the operation of the function generator circuit 61, the presence of a diode 83 in each of the channels 85 has the effect of allowing conduction through each channel only if the input voltage at the associated one of the potentiometer taps 78 is positive in the case of channel **85*a* or negative in the cases of channels 85*b* and 85*c*. In the absence of a negative accelerating voltage signal at input terminal 66, taps 78*a*, 78*b* and 78*c* are held positive by the output of battery 81. Only diode 83*a* conducts under that condition. Upon the appearance of a rising negative voltage at input terminal 66, tap 78*a* is driven progressively more positive by amplifier 71 while taps 78*b* and 78*c* become progressively more negative. Eventually points are reached at which diode 83*b* and then diode 83*c*** also conduct.

Referring now to FIG. 3 in combination with FIG. 4, the level of the deflection voltage at minimum beam energy, V1, is determined by adjustment of movable tap 78*a* and the voltages at the output of battery 81 and on the conductor 72. Movable taps 76*b* and 76*c* are set to require progressively higher voltages at input terminal 66 before conduction occurs through channels 85*b* and 85*c*. Thus, initially only channel 85*a* conducts and transmits an increasingly higher positive voltage to summing junction 84. This results in a rising positive output signal on output conductor 68 (and a corresponding negative output signal at conductor 69) as indicated graphically by the initial linear segment 59*a* of curve 58 of FIG. 3. The slope of curve segment 59*a* is determined by the setting of variable resistor 86*a*, such resistor being adjusted to provide a slope approximatingthe desired approximating the of deflection signal magnitude with increasing beam energy. When the rising voltage at input terminal 66 reaches a higher value indicated at V2 in FIG. 3, the diode 83*b* of channel 85*b* conducts to begin applying a negative voltage to summing junction 84. This negative voltage subtracts from the positive voltage being received at the summing junction from channel 58*a* and thus the second segment 59*b* of the curve 58 of FIG. 3 is flattened out relative to the first segment 59*a*. The beam energy point V2 at which this flattening of the curve 58 begins to occur may be adjusted by setting potentiometer 78*b* and the extent of the flattening may be adjusted by means of the variable resistor 86*b*. When the accelerating voltage signal at input terminal 66 rises to a still higher value corresponding to beam energy V3 of FIG. 3, the final diode 83*c* begins to conduct to apply an additional negative voltage to summing junction 84 which further flattens the curve 58 to produce the final segment 59*c*. As in the previous instance, the beam energy value V3 at which channel 85*c* begins to conduct may be selected by adjustment of movable tap 78*c* and the extent of the additional flattening may be regulated by adjustment of variable resistor 86*c*.

Through the several adjustments described above, the curve 58 of FIG. 3 may be brought into close conformity with the theoretically ideal smooth curve of progressively diminishing slope. It will be apparent that if approximation of a theoretical curve by three linear segments of diminishing slope, as provided for in this example, is insufficient to maintain the desired degree of beam position stability, then additional ones of the channels 85 may be connected between conductors 72 and 74 and summing junction 84 to produce an output curve 58 made up of a larger number of smaller linear segments.

Owing to the above-described operation of the function generator 61, the conductors 68 and 69 leading to target selector circuit 62 are supplied with positive and negative voltages which vary automatically in accordance with beam energy variations as necessary to maintain beam position stability.

Considering now a suitable structure for the target selector 62, an X-deflection signal conductor 91 of the target selector is coupled to the X-deflection terminal 53 of the beam deflection means 51 through the previously described driver amplifier 63X. Amplifier 63X is a current amplifier in this example since the degree of beam deflection in a magnetic field is a function of current magnitude in the windings 56 which establish the field. Similarly, a Y-deflection signal output conductor 92 of the target selector is coupled to the Y-deflection signal terminal 54 of deflector means 51 through amplifier 63Y which is also a current amplifier.

The basic function of the target selector 62 is to selectively enable application of the positive deflection voltage from input conductor 68 to either selected one of the output conductors 91 and 92 and to enable the negative deflection voltage from input conductor 69 to be selectively applied to either output conductor 91 or 92, depending upon which particular one of the four targets it is desired to irradiate. For this purpose four switches 94 are utilized, a first such switch 94*a* being connected between input conductor 68 and output conductor 91, the second switch 94*b* being connected between conductors 68 and 92, the third switch 94*c* being connected between conductors 69 and 91 while the fourth switch 94*d* is connected between conductors 69 and 92. Accordingly, if switch 94*a* only is closed, only the X-winding 56X of the deflection means is energized and the electron beam is deflected to strike target 46*d* in particular. If only switch 94*c* is closed, the same winding is energized with an opposite polarity and the electron beam is deflected to target 46*b* in particular. If switch 94*b* is closed, the Y-axis windings of the deflection means are energized to deflect the beam to target 46*a* while if only switch 94*d* is closed, the Y-axis windings are oppositely energized to deflect the electron beam into the final target 46*c*. It will be apparent that if additional numbers of targets 46 are utilized, additional switches may be employed as necessary to produce the needed deflections of the electron beam and if such targets should be located at different radial distances from the axis of the X-ray tube, a voltage-dividing resistance can be employed in parallel with ones of the switches to reduce the voltages applied to the X- and Y-axis amplifiers as necessary to decrease the magnitude of the deflection, the present four-target, four-selector switch system being described solely for purposes of example. As one specific variation, it may be noted that by closing both switches 94*a* and 94*b*, the electron beam in the present example can be directed to a point located between targets 46*a* and 46*b* if it should be desired to provide an additional target at that point. The beam may be similarly directed to additional points in the present example by simultaneously closing other pairs of the switches 94. It will also be apparent to those skilled in the art that the functions of the four separate switches 94 in this example can readily be achieved by replacing such switches with a two-deck, four-position rotary switch of known design.

The location at which the electron beam would strike the anode plate 16 if no target selection deflection signals were present should be a point equidistant from the centers of each of the targets 46. In practice, due to slight manufacturing irregularities in the components of the system, it may be necessary to provide some relatively small base X or Y-deflection signal, or both, to establish this point at the proper geometrical position. In other words, the nominally "undeflected" beam may actually require some slight degree of base level deflection signal to bring it to the desired base reference point relative to the targets. This cannot be accomplished extremely precisely, where beam energy variations occur, simply by making an initial adjustment of the gains of driver amplifiers 63X and 63Y. If centering of the "undeflected" beam impact point actually requires some small deflection of the beam, the point is itself affected by changes of beam energy. Thus, to provide a very high degree of beam position stability, means may be provided to make an automatic corrective change in the base levels of the X and Y-deflection signals when beam energy changes. For this purpose the resistive elements of two potentiometers 65X and 65Y may be connected in parallel between conductors 68 and 69. Conductor 91 of the target selector is coupled to X-deflection driver amplifier 63X through a differential amplifier 75X which has a reference input connected to the adjustable tap of potentiometer 65X. Similarly, conductor 92 is coupled to Y-deflection driver amplifier 63Y through another differential amplifier 75Y which has a reference input connected to the adjustable tap of potentiometer 65Y. Thus potentiometers 65X and 65Y may be adjusted to provide reference level voltages to differential amplifiers 75X and 75Y ranging between the positive voltage of the output of amplifier 89 and the negative voltage of the output amplifier 87 in order to precisely center the reference point of impact of the "undeflected" electron beam with respect to the targets. Since the voltage across potentiometers 63X and 63Y varies in accordance with changes of electron beam energy, these reference level voltages are also varied automatically to maintain the "undeflected" electron beam point constant at the predetermined centered location.

Figure 5:
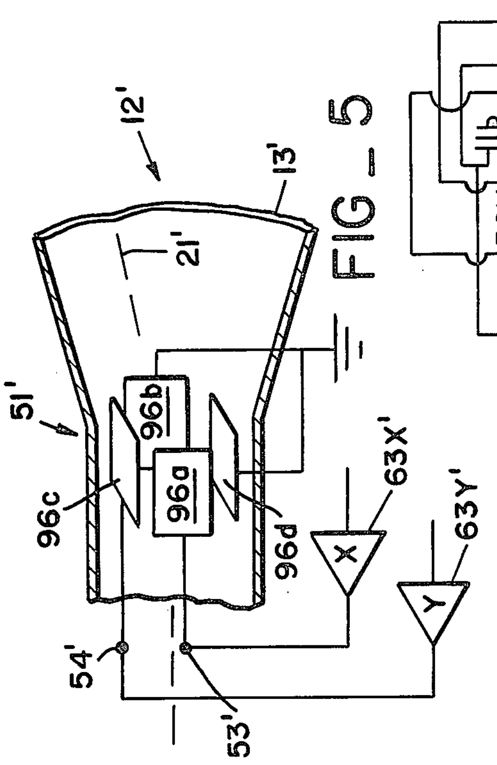
FIG. 5 is a perspective axial section view of the central region of a modified form of X-ray tube for the system depicted in FIG. 1 wherein electrostatic beam-deflection means are employed instead of the magnetic bean-deflection means of FIG. 1.

In the example of the invention described above, magnetic deflection means are utilized to control the position of the electron beam. The invention is equally adaptable to X-ray sources wherein the electron beam is controlled by electrostatic deflection means either alone or in combination with magnetic means. An X-ray source utilizing electrostatic deflection means may be similar to the embodiment described above except that as illustrated in FIG. 5 the deflection means 51' of such a modified X-ray tube 12' may consist of a first pair of conductive plates **96*a* and 96*b* spaced apart on opposite sides of the axis of the tube 12' in the central region of the tube and a second pair of parallel conductive plates 96*c* and 96*d* vertically spaced apart above and below the tube axis. One plate of each pair, plates 96*b* and 96*d*, for example, is grounded. Plate 96*a* is then coupled to the X-axis deflection signal terminal 53' while plate 96*c* is coupled to the Y-axis deflection signal terminal 54'. The circuit may otherwise be similar to that previously described except that the driver amplifiers 63X' and 63Y' which transmit the deflection signals to terminals 53' and 54' respectively are voltage amplifiers rather than current amplifiers since the deflection of the electron beam 21'** depends on electrostatic effects rather than magnetic effects as in the previous embodiment.

Thus, while the invention has been described with reference to certain specific examples, it will be apparent that many modifications are possible and it is not intended to limit the invention except as defined in the following claims.

What is claimed is:

1. A multi-target X-ray source comprising:

an evacuated envelope, anode means within said envelope supporting a plurality of spaced-apart targets for producing X-rays in response to electron bombardment of any selected one of said targets, an electron gun disposed within said envelope and spaced apart from said targets, said electron gun having an electron emissive cathode and means for forming an electron beam, a high-voltage supply having a positive terminal connected to said anode means and a negative terminal connected to said electron gun to establish a voltage difference between said cathode and said anode means for accelerating said electron beam, deflector means for deflecting said electron beam in response to deflection signals, a target selector having means coupled to said deflector means for transmitting any selected one of a plurality of different target selection deflection signals thereto to direct said electron beam to any selected one of said targets, and a beam position stabilizing circuit responsive to variations of said voltage difference and having means for increasing said target selection deflection signals in response to increases of said accelerating voltage and for decreasing said target selection deflection signals in response to decreases of said accelerating voltage.

2. An X-ray source as defined in claim 1 wherein said beam position stabilizing circuit comprises an electrical function generator having an input coupled to said high-voltage supply to sense variations of said accelerating voltage and having an output coupled to said deflector means, and having means for producing an output voltage which increases in response to increases of the voltage at said input and decreases in response to decreases of said input voltage in accordance with a predetermined mathematical relationship.

3. An X-ray source as defined in claim 2 further comprising a voltage divider having a first resistive portion and a circuit junction and a second resistive portion connected in series across said terminals of said high-voltage supply, and means connecting said circuit junction to said input of said function generator to provide said function generator with an input voltage which is proportional to said accelerating voltage but of lesser magnitude.

4. An X-ray source as defined in claim 3 comprising means for selectively adjusting the magnitude of said output voltage of said function signal generator circuit in relation to said accelerating voltage.

5. An X-ray source as defined in claim 3, wherein said second resistive portion of said voltage divider is a variable resistance.

6. An X-ray source as defined in claim 2 wherein said predetermined mathematical relationship is a nonlinear relationship and said function signal generator has means for producing progressively less change in said output voltage in response to a given degree of change of said input voltage as the absolute magnitude of said input voltage becomes progressively higher.

7. An X-ray source as defined in claim 6 wherein said function signal generator has means for producing linear increases of said output voltage in response to linear increases of said input voltage within each of a plurality of ranges of said input voltage, and means for progressively reducing said linear rate of increase of output voltage in relation to the rate of increase of input voltage at each successive higher input voltage range.

8. An X-ray source as defined in claim 7, further comprising means for selectively adjusting said rate of increase of said output voltage in relation to said rate of increase of said input voltage at each of said input voltage ranges, and means for selectively adjusting the end points of each of said voltage ranges.

9. An X-ray source as defined in claim 1 further comprising means for providing predetermined base level deflection signals to said deflector means, and means for varying the magnitude of said base level deflection signals as a function of the variations of the magnitude of said target selection deflection signals.

10. An X-ray source as defined in claim 1 wherein said deflector has X-deflection means for deflecting said electron beam in a first direction in response to an X-deflection signal and Y-deflection means for deflecting said beam in an orthogonal direction in response to a Y-deflection signal, and wherein said beam stabilization circuit has first and second output terminals and means for applying said deflection signals to said first output terminal as a positive voltage and for applying said deflection signals to said second terminal as a negative voltage, and wherein said target selector has switch means for selectively coupling either of said output terminals with either of said X-deflection means and said Y-deflection means.

11. An X-ray source as defined in claim 10 further comprising first and second differential amplifiers coupled between said target selector means and said X-deflection means and said Y-deflection means respectively and each having a reference voltage input, and first and second potentiometers each having a resistive element connected between said output terminals of said beam stabilization circuit, said first potentiometer having an adjustable tap connected to said reference voltage input of said first differential amplifier and said second potentiometer having an adjustable tap connected to said reference voltage input of said second differential amplifier.

12. An X-ray source as defined in claim 10 wherein said X-deflection means and said Y-deflection means are magnetic deflection devices, further comprising first and second current amplifiers coupled between said first and second outputs of said beam stabilization circuit and said deflection devices.

13. An X-ray source as defined in claim 10 wherein said X-deflection means and said Y-deflection means are electrostatic deflection devices, further comprising first and second voltage amplifiers coupled between said first and second outputs of said beam stabilization circuit and said deflection devices.

14. An X-ray source as defined in clain 1 further comprising means for selectively varying said voltage difference between said cathode and said anode means.

15. An X-ray source as defined in claim 1 including means coupled to said high-voltage supply for producing a beam stabilization circuit input voltage which is proportional to said voltage difference between said cathode and said anode means, and wherein said beam position stabilizing circuit further comprises a summing junction for producing said deflection signals, a plurality of electrically resistive elements, a like plurality of diodes each being connected between said summing junction and an intermediate point between the ends of a separate one of said resistive elements, one of said diodes being connected between said summing junction and the associated one of said resistive elements in electrically inverted relationship relative to the others of said diodes, power supply means providing a fixed voltage of first polarity to one side of said one diode and a fixed voltage of opposite polarity to one side of each of said other diodes, and means for transmitting a voltage proportional to said input voltage to the other sides of each of said resistive elements.

16. An X-ray source as defined in claim 15 wherein said resistive elements are each a component of a separate one of a plurality of potentiometers which include means for selectively adjusting the point of connection of each of said diodes with the associated one of said resistive elements, and a plurality of variable resistors each being connected between said summing junction and a separate one of said resistive elements in series with a separate one of said diodes.

17. A multi-target X-ray source for producing X-rays of selectable wavelength spectra, comprising:

an X-ray tube having an electron gun and a plurality of spaced-apart target-anodes of different composition for producing X-rays of different wavelengths upon being bombarded by an electron beam from said gun, and having X- and Y-deflection means between said electron gun and said target-anodes for deflecting said electron beam in orthogonal directions in response to X- and Y-deflection signals whereby said electron beam may be selectively directed to any one of said target-anodes, a high voltage supply having a negative side coupled to said electron gun and a positive side coupled to said target anodes to establish an electron beam accelerating voltage therebetween, and having beam energy control means for selectively varying said accelerating voltage, means for producing an accelerating voltage signal which varies in accordance with variations of said accelerating voltage, and a deflection signal generator coupled to said deflection means for producing said X- and Y-deflection signals and including means coupled to said accelerating voltage signal means for increasing said deflection signals when said accelerating voltage increases and for decreasing said deflection signals when said accelerating voltage decreases.

* * * * *

UNITED STATES PATENT AND TRADEMARK OFFICE

CERTIFICATE OF CORRECTION

PATENT NO. : 4,007,375

DATED : February 8, 1977

INVENTOR(S) : RICHARD D. ALBERT

It is certified that error appears in the above-identified patent and that said Letters Patent are hereby corrected as shown below:

Column 3, line 22: "bean" should read --beam--.

Column 9, line 15: "imatingthe desired approximating the of deflection" should read --imating the desired rise of deflection--.

Signed and Sealed this

Tenth Day of May 1977

[SEAL]

Attest:

RUTH C. MASON
*Attesting Officer*

C. MARSHALL DANN
*Commissioner of Patents and Trademarks*